April 9, 1946. P. G. FRAZIER 2,398,300
POWER TRANSMISSION DEVICE
Filed May 3, 1944 2 Sheets-Sheet 2
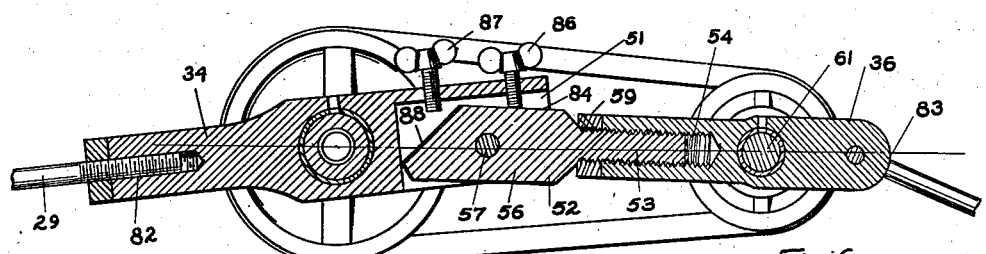
Fig. 6
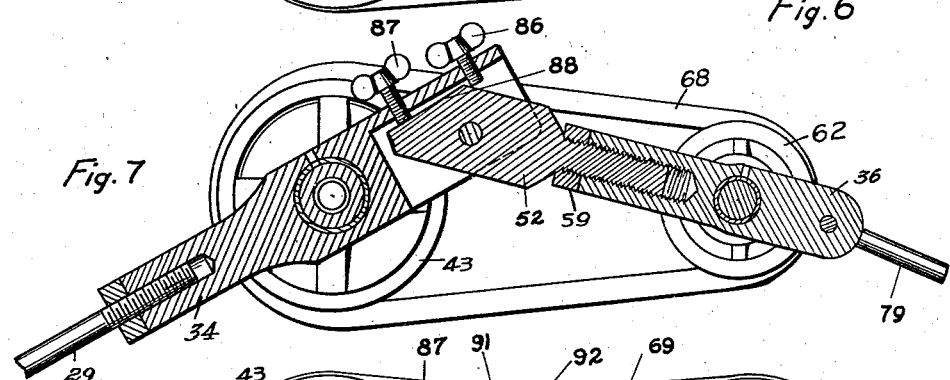
Fig. 7
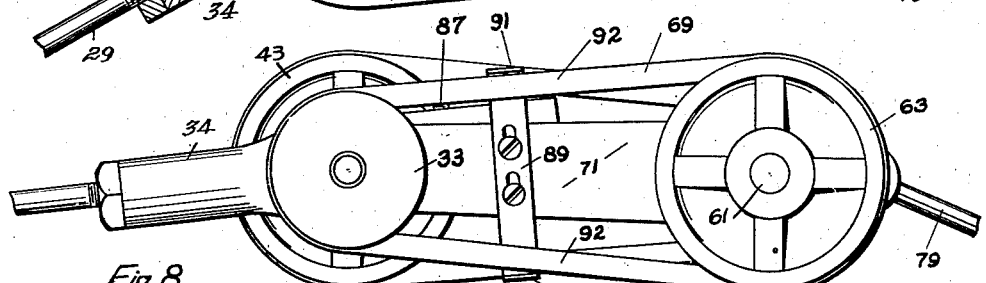
Fig. 8
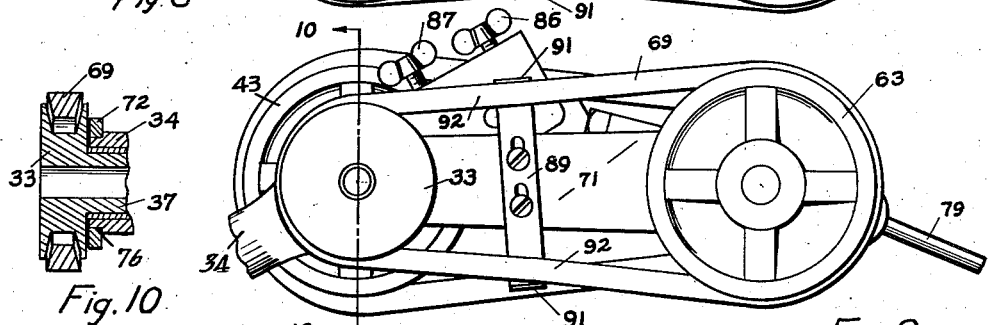
Fig. 10
Fig. 9
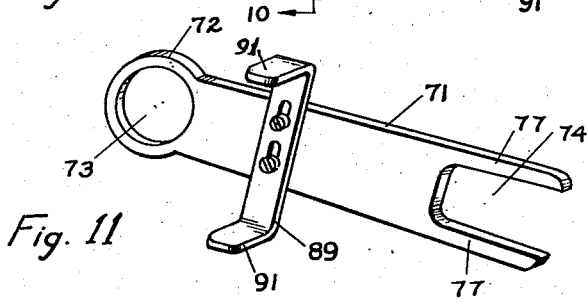
Fig. 11
Inventor
Pearl G. Frazier
by Rudolph L. Lowell
Attorney Patented Apr. 9, 1946

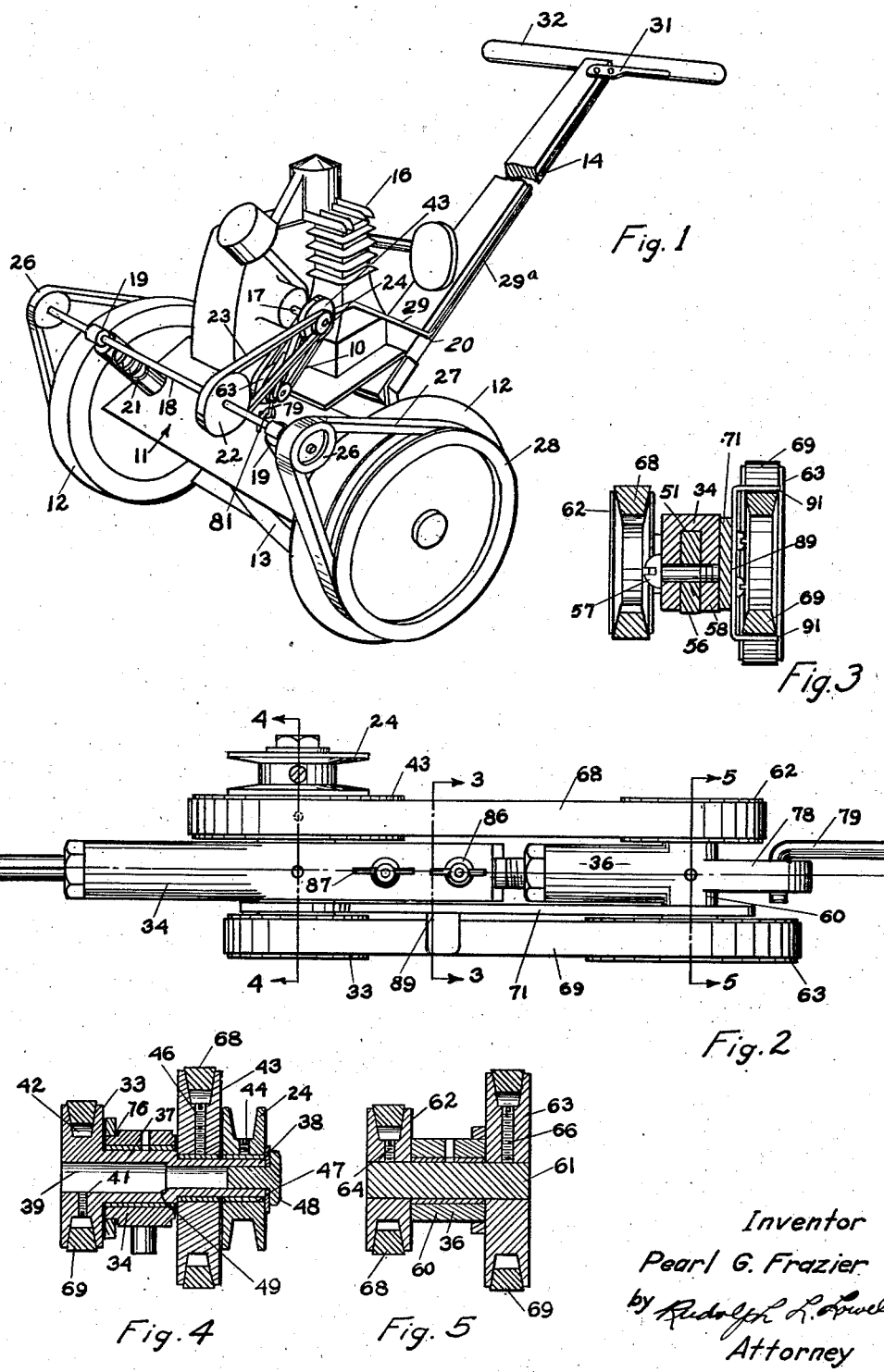

2,398,300

UNITED STATES PATENT OFFICE 2,398,300

POWER TRANSMISSION DEVICE

Pearl G. Frazier, Des Moines, Iowa

Application May 3, 1944, Serial No. 533,961

11 Claims. (Cl. 74—242.13)

This invention relates generally to power transmission devices and in particular to a belt and pulley power transmission device adapted to be supported on a power shaft and including in a unit assembly a speed reduction means, means for engaging and disengaging a belt connecting the transmission device with a drive pulley on a power shaft, and means for holding the belt out of engagement with the drive pulley when the belt is in a disengaged position.

An object of this invention is to provide an improved power transmission device.

A further object of this invention is to provide a power transmission device of belt and pulley type in which a belt for operatively connecting a driving pulley on a power shaft with a driven pulley in the power transmission device is moved away from the driving pulley concurrently with the operative disengagement of the belt from such two pulleys, whereby to prevent the belt being frictionally burned or worn out by the drive pulley when the transmission device is not being operated.

Yet another object of this invention is to provide a power transmission device which is readily assembled between a power unit and an operating unit without requiring any rearrangement of the parts of such two units.

A further object of this invention is to provide a power transmission device adapted to be mounted on a power shaft and including in a unit assembly speed reduction means relatively arranged to provide for a power take-off portion in the transmission device being in coaxial alignment with the power shaft.

A feature of this invention is found in the provision of a power transmission device having a driven unit belt connected with a driving pulley, in which the driven unit is manually actuated for movement toward and away from the driving pulley to provide for the operative engagement and the disengagement of the belt with the driving pulley. A guide plate movable in response to the movement of the driven unit includes a pair of oppositely arranged portions projected between the driven unit and the driving pulley adjacent the outside of opposite portions of the belt to engage and move such opposite portions inwardly toward each other, when the belt is out of operative engagement with the driven unit and the driving pulley, whereby to hold the belt away from the driving pulley.

Further objects, features and advantages of this invention will become apparent from the following description when taken in connection with the accompanying drawings in which:

Fig. 1 is a perspective view of a power lawn mower showing the power transmission device of this invention in assembly relation therewith;

Fig. 2 is a plan view of the power transmission device;

Fig. 3 is a transverse sectional view taken on the line 3—3 in Fig. 2;

Fig. 4 is a transverse sectional view as seen along the line 4—4 in Fig. 2;

Fig. 5 is a transverse sectional view on the line 5—5 in Fig. 2;

Fig. 6 is a longitudinal sectional view on the line 6—6 in Fig. 2;

Fig. 7 is illustrated similarly to Fig. 6 and shows parts thereof in changed position;

Fig. 8 is an elevational view of the power side of the transmission device;

Fig. 9 is illustrated similarly to Fig. 8 with parts thereof shown in changed position;

Fig. 10 is a fragmentary sectional view of the driving pulley as seen along the line 10—10 in Fig. 9; and Fig. 11 is a detail perspective view of the unit providing for the belt being held away from the driving pulley when the power transmission device is not being operated.

With reference to the drawings the power transmission device of this invention is indicated generally as 10 in Fig. 1 and illustrated in assembly relation with a power lawn mower including a frame 11, ground wheels 12, a rotary cutter 13 and a handle 14. A power unit 16, illustrated as an air-cooled type internal combustion engine, is mounted on the frame 11 and includes a power shaft 17 operatively connected through the transmission device 10, with a driven shaft 18 on the mower extended between the ground wheels 12 and rotatably supported in bearings 19 yieldably supported on spring units 21 carried on the frame 11. Mounted on the driven shaft 18 is a pulley 22 connected by a belt 23 with a power take-off pulley 24, comprising part of the transmission device 10, and pulleys 26 connected by belts 27 with pulleys 28 on the ground wheels 12. A clutch rod 29 providing for the transmission and cutoff of power to the ground wheels 12 is operatively connected at one end to the power transmission device 10 with its free end pivoted at 20 to one end of a rod 29a extended longitudinally of the handle 14. The opposite end of the rod 29a is pivoted to a clutch lever 31 which in turn is pivoted on the mower handle 14 adjacent the hand grip 32.

The power transmission device 10 includes a drive pulley 33 and a frame unit comprised of a pair of pivotally connected together body members 34 and 36 (Figs. 2 and 4). The driving pulley 33 has an axial extension or hub portion projected from one side and formed with an enlarged section 37 and a reduced section 38. A central bore 39 in the pulley 33 is of a size adapted to receive the power shaft 17 of the engine 16, with the pulley being secured to the shaft 17 against rotational movement by friction screws 41 extended through the bottom of the pulley belt groove 42. The body member 34 is pivotally supported, at a position substantially intermediate its ends, on the enlarged hub section 37.

Rotatably supported on the reduced hub section 38 for rotation relative to the pulley 33, are a pulley 43 and the power take-off pulley 24, the pulleys 24 and 43 being frictionally held by cap screws 44 and 46, respectively, on a bushing 47 rotatable on the reduced hub section 38. These two pulleys are retained against axial movement on the hub section 38 by a screw assembly 48 threadable within the hub section 38 and a shoulder 49 defining the junction between the hub sections 37 and 38.

The inner end of the body member 34 (Figs. 6 and 7) is of a substantially rectangular shape in cross section and formed with a longitudinally extended groove 51 which is open to the inner end of the body member 34. The body member 36 includes a longitudinally adjustable extension 52 at its inner end having a shank 53 threadably connected in a threaded bore 54 in the body member 36. The free end 56 of the extension 52 is of a flat form corresponding in shape and size to the groove 51 in the body member 34 so as to be loosely receivable within the groove 51. The body members 34 and 36 are pivotally connected together by a screw 57 extended through the sides of the groove 51 and through the extension end 56, with the screw 57 being threadably connected in one side of the groove 51 indicated as the side 58 in Fig. 3. The extension 52 is held in an adjusted position by a locking nut 59 threadable on the shank 53 to a position against the inner end of the body member 36. It is seen, therefore, that the body members 34 and 36 are pivotally movable relative to each other about the screw 57, for a purpose which will appear later.

Mounted on a pin or shaft 61 rotatably supported in a bearing portion 60 adjacent the outer end of the body member 36 and arranged at opposite sides of the body member 36 are a pair of pulleys 62 and 63 (Figs. 2 and 5). The pulleys 62 and 63 are secured to the shaft 61 against relative rotational movement by friction screws 64 and 66, respectively.

As best appears in Fig. 2 the pulleys 43 and 62 are arranged for rotation in a common plane and connected with a V-belt 68; while the pulleys 33 and 63 are rotatable in a common plane and connected with a V-belt 69. Extended between the pulleys 33 and 63 adjacent their inner sides is a plate member 71 (Figs. 2, 8 and 11) having a circular opening 73 at one end 72 and a central longitudinally extended slot 74 at its opposite end. The end 72 is pivotally supported on an annular shoulder 76 (Figs. 4 and 10) projected laterally of the body member 34 in a concentric relation with the hub section 37 of the pulley 33, while the side walls 77 of the slot 74 are arranged in a straddling relation about the circular bearing portion 60 of the body member 36. By virtue of this assembly with the body members 34 and 36 the longitudinal axis of the plate member 71 is retained in a plane common to the axes of the pulleys 33 and 63 at all relatively pivotal moved positions of the body members 34 and 36, for a purpose which will be hereinafter described.

In the assembly of the power transmission device 10 between a power unit such as the engine 16, and an operating unit such as the lawn mower illustrated in Fig. 1, the pulley 33 is mounted on the power shaft 17 with the outer end of the body member 34 extended in an upward direction. The outer end of the body member 36 (Fig. 2) is formed with a longitudinal extension 78 which is pivoted to one end of a lever 79 the opposite end of which is pivoted, as indicated at 81 in Fig. 1, to a portion of the lawn mower frame 11. It is to be understood that this movable support of the outer end of the body member 36 may be made on either a stationary part of either the power unit or the operating unit depending upon the particular arrangement and construction of these two units. The clutch rod 29, as illustrated in Figs. 6 and 7, is threadably connected with the outer end of the body member 34, as indicated at 82, and may be of any desired length or shape adapted to provide for a convenient manual actuation.

With the transmission device 10 thus assembled relative to a power unit and an operating unit the clutch rod 29 is manipulated to pivotally move the body members 34 and 36 to substantially longitudinally aligned positions as illustrated in Figs. 6 and 8. At this position of the body members 34 and 36 the pivot 57 between the body members is substantially within a plane, indicated at 83 in Fig. 6, common to the axes of the pulleys 33 and 63. This longitudinally aligned position is defined by the engagement of the side 84 of the extension end 56 with the bottom of an adjustable screw 86 threadable through the bottom of the groove 51.

When it is desired to have the members 34 and 36 automatically locked in a longitudinally aligned position the screw 86 is adjusted to provide for the location of the pivot 57 either in or below the plane 83 as viewed in Fig. 6. This automatic locking of the members 34 and 36 in a substantially longitudinally aligned position may be referred to as a "lock clutch" action. In some instances, however, it may be desired to have what is commonly called a "draw clutch" action, that is, the holding of the members 34 and 36 in a substantially longitudinally aligned position only when a manual pressure is continuously applied to the clutch rod 29. This "draw clutch" action is accomplished by adjusting the screw 86 so that the axis of the pivot 57 is retained in a position above the plane 83, as viewed in Fig. 6.

With the body members in their relative positions shown in Figs. 6 and 8 the belts 68 and 69 are in frictional operative engagement with the pulleys 43 and 62, and 33 and 63, respectively, to provide for the transmission of power from the shaft 17 to the shaft 18. In order to adjust the tension in the belts 68 and 69 relative to their corresponding pulleys the extension 52 is adjustable longitudinally of the body member 36. This adjustment is accomplished by removing the pivot screw 57 and the belts 68 and 69, whereby the body member 36 and the pulleys 62 and 63 are removable as a unit from their assembly relation with the body member 34. The locking nut 59 is then released and the extension 52 rotated a complete revolution relative to the body member 36 in a direction depending upon whether the tension in the belts 68 and 69 is to be reduced or increased. The locking nut 59 is then tightened against the inner end of the body member 36, the body member 36 reconnected with the body member 34 by the pivot screw 57, and the belts 68 and 69 replaced.

To cut off the supply of power from the shaft 17 to the shaft 18 the clutch rod 29 is manipulated to pivotally move the body members 34 and 36 to their relative positions shown in Figs. 7 and 9. This breaking action between the members 34 and 36 is limited by an adjusting screw 87 threadably extended through the bottom of the groove 51 and engageable with the tapered free end 88 of the extension 52. This pivotal movement between the members 34 and 36 provides for a movement of the pulleys 43 and 33 toward their respective pulleys 62 and 63 whereby to reduce the tension in their corresponding belts 68 and 69, whereby to operatively disengage the belts. The power transmission device is thus rendered inoperative to transmit power to the operating unit. However, since the drive pulley 33 is mounted on the power shaft 17 its rotation continues when the transmission device is not operated.

With a belt loosely supported on a rotating pulley considerable difficulties have been encountered by virtue of the belt being frictionally burned or worn away by the action of the rotating pulley thereon. This difficulty has been overcome in the present invention by the provision of means including the plate member 71 previously described.

Adjustably supported on the outside of the plate member 71 for adjustable movement transversely of the plate member and intermediate the pulleys 33 and 63 is a member 89, of a substantially U-shape, having its leg members 91 projected laterally from the plate member 71 in a straddling relation with the opposite sides 92 of the belt 69. The leg members 91 are spaced a distance apart such that when the body members 34 and 36 are in a substantially longitudinally aligned position the leg members are out of engagement with the sides 92 of the belt 69, as illustrated in Figs. 3 and 8.

Concurrently with the movement of the body members 34 and 36 to their broken or pivotally moved positions illustrated in Figs. 7 and 9 the slotted end 74 of the plate member 71 is slidably moved on the bearing portion 60 to retain the longitudinal axis of the plate member 71 in a plane normal to the axes of the pulleys 33 and 63. As a result of this movement of the plate member 71 the legs 91 of the member 89 are moved to in turn engage and move the sides 92 of the belt 69 inwardly toward each other substantially equal distances. This inward movement of the belt sides 92 flexes or moves the belt 69 outwardly and away from a frictionally engaging position with the pulley 33 as indicated in Figs. 9 and 10. This flexing action in the belt 69 takes place by virtue of the normal stiffness in the belt and the retention of its sides 92 by the legs 91 against spreading outwardly away from each other on movement of the pulley 63 toward the pulley 33. Because of this holding action of the belt 69 by the member 89 when the transmission device is not being operated, a frictional burning or wearing of the belt 69 by the pulley 33 is prevented.

As illustrated in the drawings the pulley 63 is of a larger size than the driving pulley 33, while the pulley 62 rotatable with the pulley 63 is of a smaller size than the pulley 43. It is to be understood, however, that the relative sizes of the pulleys can be changed to provide for a wide variation in the rates of speed of the power shaft on the power unit relative to the driven shaft on the operating unit. It is apparent also that the relative arrangement of the pulleys 33, 43 and 24 on the body member 34 can be changed so as to provide for the power take-off pulley 24 being adjacent to the driving pulley 33.

From a consideration of the above description it is seen that the invention provides a power transmission device of belt and pulley type which is of a simple and rugged construction, comprised of but a relatively few number of parts assembled in a compact unit and including a speed reduction means, a means for controlling the transmission of power to an operating unit operatively connected to a power take-off unit in the transmission device, and means for prolonging the life of the belts used in the transmission device.

Although the invention has been illustrated and described with respect to a power lawn mower it is to be understood that this illustration is merely typical of one of the applications of the transmission device.

It is to be understood also that although only a preferred embodiment of the invention has been described that the invention is not to be so limited since changes and modifications can be made therein which are within the full intended scope of the invention as defined by the appended claims.

I claim:

1. A power transmission device comprised of a frame unit including two body members having their inner adjacent ends movably connected together, means limiting the relative movement of said two body members between two positions, a pair of transversely extended shafts oppositely arranged on said frame unit, a drive pulley on one of said shafts adapted to be connected with a source of power, a driven pulley on the other of said shafts, a belt connectible with said two pulleys, means operatively connected with one of said two body members to provide for a relative movement of said two body members between said two limiting positions, means movably supported on said two body members having a portion movable into engagement with said belt at one of said limiting positions to hold said belt out of frictional engagement with said drive pulley, and movable out of engagement with said belt at the second of said limiting positions to provide for the operative connection of said two pulleys by said belt.

2. A power transmission device including a frame unit comprised of two body members movably connected together at their inner ends for relative movement to two operating positions, a driving pulley and a driven pulley oppositely arranged on said frame unit for rotation in a common plane, a belt connectible with said two pulleys, said belt, when said two members are in one of said operating positions, being under tension to operatively connect said two pulleys, and at the other of said operating positions being substantially free of tension to disconnect said two pulleys, and means movably supported on said frame unit for longitudinal movement between the axes of said two pulleys in response to the relative movement between said two body members, including a portion engageable with said belt at said other operating position to hold the belt out of frictional engagement with said driving pulley.

3. A power transmission device comprising a driving pulley connectible with a source of power, a driven pulley in the plane of said driving pulley, a belt connectible with said two pulleys, means supporting said driven pulley for movement relative to said driving pulley to provide for the operative connection and disconnection of said belt with said two pulleys, and means movable in response to the movement of said driven pulley to engage said belt, when the belt is out of operative connection with said two pulleys, to hold said belt away from a frictionally engaging position with said driving pulley.

4. A power transmission device comprising a pair of body members having their inner ends pivotally connected together, a driving pulley attachable with a source of power rotatably supported adjacent the outer end of one of said members, a driven pulley rotatably supported adjacent the outer end of the other of said body members for rotation in the plane of said driving pulley, means movably supporting said outer end of the other body member, a belt connectible with said two pulleys, with relative pivotal movement of said two body members to one position providing for the operative engagement of said belt with said two pulleys, and relative pivotal movement of said two body members to a second position providing for said belt being out of operative engagement with said two pulleys, and means movably supported on said two body members for longitudinal movement between the axes of said two pulleys in response to a relative pivotal movement between said two body members including a portion engageable with said belt, when said two body members are in said second position, to hold said belt out of frictional engagement with said driving pulley.

5. A power transmission device including a pair of body members, means pivotally connecting together the inner ends of said body members, a driving pulley attachable with a source of power, means rotatably supporting said driving pulley adjacent the outer end of one of said body members, a driven pulley, means rotatably supporting said driven pulley adjacent the outer end of the second of said body members for rotation in the plane of said driving pulley, means movably supporting said outer end of the second body member, a belt connectible with said two pulleys, with relative pivotal movement of said two body members to one position providing for the connection of said belt with said two pulleys, and relative pivotal movement of said two body members to second position providing for the disconnection of said belt from said two pulleys, a supporting member having one end slidably supported on said second body member for linear movement normal to the axis of said driven pulley, and its opposite end pivotally supported on said one body member for pivotal movement about an axis coincident with the axis of said driving pulley, and a belt engaging member mounted on said supporting member and movable into engagement with opposite side portions of said belt, on pivotal movement of said two body members to said second position, to hold said belt out of engagement with said driving pulley.

6. A power transmission device comprising a pulley adapted to be mounted on a rotary power shaft, an axial extension on said pulley, a first body member pivotally supported on said extension, a second body member pivotally connected at one end with said first body member, a bearing portion adjacent the opposite end of said second body member, a driven pulley rotatably supported in said bearing portion for rotation in the plane of said drive pulley, means movably supporting said opposite end of the second body member, a supporting member pivoted at one end on said axial extension and slidably supported at its other end on said bearing portion, a belt connectible with said two pulleys, said two pulleys, on relative pivotal movement of said two body members to one position, being moved into operative engagement with said belt, and on relative pivotal movement of said two body members to a second position being moved out of operative engagement with said belt, and a belt-engaging member on said supporting member having oppositely arranged portions projected between said two pulleys adjacent opposite sides of said belt, said projected portions, on relative pivotal movement of said two body members to said second position, being moved to engage and hold said belt away from said driving pulley.

7. A power transmission device comprising a driving pulley and a driven pulley, means rotatably supporting said two pulleys for rotation in a common plane, a belt connectible with said two pulleys, means providing for the movement of said driven pulley toward and away from said driving pulley to operatively connect and disconnect said belt with said two pulleys, a member movably mounted on said supporting means and extended between said two pulleys so as to be in a plane normal to the axes of said two pulleys at all moved positions of said driven pulley, and a U-shaped member extended transversely of said last mentioned member with the leg portions thereof projected between said two pulleys and adjacent oppositely arranged sides of said belt, said leg portions, on movement of said driven pulley to disconnect said belt, being moved to engage and move said opposite belt sides inwardly toward each other whereby to hold said belt away from said drive pulley.

8. A power transmission device comprising a pair of body members having their inner ends pivoted together, coacting means on said two body members for limiting the relative pivotal movement of said two body members between two positions, a drive pulley adapted to be supported on a power shaft and having an axially extended portion, with one of said body members having its outer end pivoted on said extended portion, a bearing portion on the other of said body members, a driven pulley rotatably supported on said bearing portion for rotation in the plane of said drive pulley, means movably supporting the outer end of said other body member, manually operated means connected with the outer end of said one body member to provide for a relative pivotal movement between said two body members, with said two pulleys in one of said moved positions of said two body members being operatively engaged with said belt, and in the other of said moved positions of the two body members being out of operative engagement with said belt, a supporting member pivoted at one end on said one body member for pivotal movement about an axis coincident with the axis of said drive pulley, and slidably supported at its opposite end on said bearing portion, with the longitudinal axis of said supporting member being in a plane common to the axes of said two pulleys at said two moved positions of said two body members, a belt-engaging member carried on said supporting member having a pair of spaced projections extended between said two pulleys and adjacent opposite sides of said belt, said projections, when said two pulleys are moved out of operative engagement with said belt, engaging and moving said belt to a position away from said driving pulley.

9. A power transmission device including a frame unit, a drive pulley attachable with a source of power and rotatably supported on said frame unit, a driven pulley, a belt connectible with said two pulleys, means supporting said driven pulley on said frame unit for rotation in the plane of said drive pulley and for movement toward and away from said drive pulley to provide for the operative connection and disconnection of said two pulleys by said belt, and means movably supported on said frame unit and extended between said two pulleys and adapted at all moved positions of said driven pulley to be in a plane normal to the axes of rotation of said two pulleys, and a member on said movable means intermediate said two pulleys having a pair of oppositely arranged portions projected laterally from said movable means to positions adjacent to the outside of opposite portions of said belt, said member, on movement of said driven pulley to disconnect said belt from operative engagement with said two pulleys, engaging and holding said belt away from said drive pulley.

10. A power transmission device including a drive pulley adapted to be mounted on a power shaft, a hub portion on said drive pulley, a first body member pivotally supported adjacent one end on said hub portion, a second body member pivoted at one end to said first body member, means movably supporting the other end of said second body member, manually operated means connected with said first body member to provide for a relative pivotal movement of said two body members into and out of a position of substantial longitudinal alignment, a driven pulley rotatably supported on said second body member for rotation in the plane of said drive pulley, a first belt connectible with said driving and driven pulleys, a third pulley on said second body member rotatable with said driven pulley, a fourth pulley rotatable on said first body member in the plane of said third pulley and independently of said driving pulley, a second belt connectible with said third and fourth pulleys, a power take-off portion rotatable with said fourth pulley, with said driven pulley and third and fourth pulleys constituting means providing for a variation in the rotational speeds of said drive pulley and power take-off portion, with movement of said second body member to a position in substantial longitudinal alignment with said first body member operatively engaging said two belts with their corresponding pulleys, and with movement of said second body member out of a longitudinally aligned position with said first body member providing for said two belts being out of operative engagement with their corresponding pulleys.

11. A power transmission device including a drive pulley adapted to be mounted on a power shaft, a hub portion on said drive pulley, a first body member pivoted adjacent its outer end on said hub portion, a second body member, pivot means pivotally connecting together the inner ends of said two body members, means movably supporting the outer end of said second body member, a driven pulley rotatably supported on said second body member for rotation in the plane of said driving pulley, a belt connectible with said two pulleys, means for relatively pivotally moving said two body members, means for limiting said relative pivotal movement in one direction at a position in which said pivot means is located substantially in a plane common to the axes of said two pulleys to provide for the operative engagement of said belt with said two pulleys, and means for limiting said relative pivotal movement in an opposite direction at a position in which said belt is out of operative engagement with said two pulleys.

PEARL G. FRAZIER.